United States Patent [19]

Hine et al.

[11] 4,235,563
[45] * Nov. 25, 1980

[54] METHOD AND APPARATUS FOR FEEDING POWDER

[75] Inventors: Charles R. Hine, Portage; Craig B. Peot, Kalamazoo, both of Mich.

[73] Assignee: The Upjohn Company, Kalamazoo, Mich.

[*] Notice: The portion of the term of this patent subsequent to May 29, 1996, has been disclaimed.

[21] Appl. No.: 21,630

[22] Filed: Mar. 19, 1979

Related U.S. Application Data

[62] Division of Ser. No. 814,540, Jul. 11, 1977, Pat. No. 4,156,546.

[51] Int. Cl.³ .................. B65G 53/40; B65G 53/60; B65G 53/66
[52] U.S. Cl. ............................... 406/23; 406/33; 406/85; 406/163; 406/169; 406/171
[58] Field of Search .............. 264/121, 297; 425/352, 425/353, 354, 355, 256; 222/56, 311, 317, 346, 561; 406/23, 33, 157, 163, 168, 169, 175, 197, 85

[56] References Cited

U.S. PATENT DOCUMENTS

| | | | |
|---|---|---|---|
| 2,209,842 | 7/1940 | Murray | 406/157 |
| 2,890,081 | 6/1959 | Terrett | 406/169 |
| 3,105,620 | 10/1963 | Atkins et al. | 222/561 X |
| 3,195,958 | 7/1965 | Goins | 264/121 X |
| 3,257,151 | 6/1966 | Sprackling | 406/163 |
| 3,322,957 | 5/1967 | Scoggin | 222/56 X |
| 3,365,240 | 1/1968 | Gordon | 406/169 |
| 3,489,464 | 1/1970 | Delfs | 406/28 |
| 3,694,037 | 9/1972 | Feder | 406/23 |
| 3,726,954 | 4/1973 | Munk et al. | 264/121 |
| 3,874,560 | 4/1975 | Powning | 406/50 |

FOREIGN PATENT DOCUMENTS

2122858 3/1972 Fed. Rep. of Germany.

Primary Examiner—James L. Rowland
Attorney, Agent, or Firm—Blanchard, Flynn, Thiel, Boutell & Tanis

[57] ABSTRACT

A method and apparatus for improving the flow of a powder from a source, such as a large hopper, to the intake of a conventional machine wherein such powder is compressed into tablets. Devices are arranged along the route of powder flow so as to restrict, decelerate and depressurize such powder flow and thereby prevent its surging, compaction and/or bridging. These devices are also arranged to maintain the powder in a loose condition of uniform density.

In the preferred embodiments, said devices include most or all of a return duct to the powder source, an upper filter to atmosphere, an upper baffle against which the powder is directed, a restriction, an elongated powder tube through which the powder flows, a lower baffle and a final pressure relief filter to atmosphere. Mechanism in the tableting machine receives the thusly prepared powder and forms it into tablets much faster than previously possible. Also, said devices increase substantially the range of materials, including powders and granules, which can be compressed into tablets.

6 Claims, 14 Drawing Figures

METHOD AND APPARATUS FOR FEEDING POWDER

This is a division, of application Ser. No. 814,540, filed July 11, 1977, now U.S. Pat. No. 4,156,546.

FIELD OF THE INVENTION

The invention relates in general to a method and apparatus including pneumatic pressure for conveying powder from a source to a tableting machine and, more particularly, to a method and means for controlling the flow of such powder from a primary supply, such as a large hopper, to and into the powder receiving zone of a tableting machine wherein such powder is compressed into tablets.

BACKGROUND OF THE INVENTION

Tableting machines for the compression of powders into tablets have been known for a great many years, and it has been conventional to convey said powders by gravity from a source of supply, such as a large tank or hopper located above the tableting machine, sometimes through secondary hoppers, into that part of the tableting machine wherein such powders are compressed into tablets.

It has been recognized for years that the output of existing tablet machines has been limited by the speed at which the powder could be moved from the supply thereof to the die cavities of the tableting machine without adversely affecting the quality of the tablets. It is the purpose of the present invention to improve powder flow and thus improve the output of such machines.

It has long been known that some powders are inherently of a somewhat cohesive nature and hence it has been the practice in many cases first to granulate these powders to render them more flowable and thereby prevent, or at least minimize, their tendency to become compacted, plugged or bridged within the feed system and thereby at least to restrict, if not stop, the powder flow.

By way of example, some powders must contain so much medication that the binders and/or other inert excipients must be minimized to avoid a tablet of uningestible size. The nature of some medications is such that the lubricants, binders and/or disintegrants, for example, required with the medicated powders create severe flow problems which have previously prevented direct compaction of these mixtures, at least at a commercially acceptable rate. Also, the nature of some powdered medications is such that they severely limit the choices of excipients to those which display bad flow characteristics, even when they are mixed with the medication.

The aforesaid problems arising out of poor flow characteristics are also found in other fields, such as the tableting or compaction of candy, soap, sintered metal pellets and the like.

It is thus desirable to provide an improved method of handling direct compaction powders so as to eliminate the cost, the further time required, and the danger of variables involved as a consequence of such additional step, namely, the granulation step. However, it is also desirable to improve the flow of certain granules from their source of supply to the tableting machine.

It has been observed in many instances that, where the powders are delivered directly from standard feed hoppers to the tableting machine for compression thereby into tablets, the machine can form tablets from such powder much more rapidly than the powder can be delivered to the tableting zone. Accordingly, to prevent powder starvation, due to interruption of proper powder flow, and consequent tablet weight variation, it has been necessary to run the tableting machine at a rate less, often much less, than it is inherently capable of operating. In some instances, the tableting machine has been able to operate at only about 25 percent of the speed of which it is capable because of said limitations in the delivery capacity of the powder feeding system.

Related to, but distinguishable from, this problem is the necessity of balancing the powder feed to the demand of the tableting machine. While diligent efforts have been made to maintain the tablets as uniform as possible, there is nevertheless some slight variation therein which some tableting machines are programmed to sense and compensate. However, where machines lack these compensating features, it was found that tablet weight variations were often created by corresponding, uncontrolled variations in the weight of the powder backed up in the feeding system. Material variations in the weights of medicinal tablets often produce unacceptable variations in the dosage of such tablets. Thus, there has been a need for a feed system by which to provide prompt adjustments in the amount of the powder being provided by the feeding system, particularly where such machines do not have powder quantity or weight sensing devices.

It was found that the desired control and adjustment of the powder in the feed system could be more adequately achieved by urging the powder from the primary source by a successive plurality of bursts of entraining fluid, normally air.

Therefore, the objects of the invention include:

1. To provide a method and apparatus for feeding powder from a primary source, such as a relatively large hopper, to the intake means of a tableting machine, said feeding apparatus being able to effect a high volume of powder transmission with a minimum of compacting, bridging or interrupting the flow of the powders either within such feeding apparatus itself or within the intake mechanism of the tableting machine.

2. To provide apparatus, as aforesaid, which will effectively reduce, if not eliminate, the pressure created by the air-powder stream before it reaches the tableting machine so that the air itself will not act as a compacting force upon the powder.

3. To provide apparatus, as aforesaid, which will automatically adjust for momentary differentials between the demand of the tableting machine for powder and the delivery of the powder by the feeding system, so as to maintain a constant supply of said powder with minimum variations in the amount of powder in the feed system.

4. To provide apparatus, as aforesaid, which will insure that the powder is delivered to the tableting dies at a high level of uniformity in density and a low level of both static and velocity pressure.

5. To provide apparatus, as aforesaid, which will be compatible with available equipment and which can be easily installed thereinto as modifications thereof.

6. To provide apparatus, as aforesaid, whose components can be selected through a broad range of sizes and other specific details.

7. To provide apparatus, as aforesaid, which will be relatively easy to install, operate, adjust and maintain.

8. To provide apparatus, as aforesaid, which will have minimal moving parts and, hence, be capable of long and reliable operation with a minimum of maintenance.

9. To provide apparatus, as aforesaid, which is capable of feeding powder having poor flow characteristics, in order to form tablets therefrom by direct compaction.

10. To provide apparatus, as aforesaid, which would be capable of supplying powder to plural machines at the same time from a remote source of supply.

Other objects and purposes of the invention will be apparent to persons acquainted with apparatus of this general type upon reading the following specification and inspecting the accompanying drawings.

SUMMARY OF THE INVENTION

The objects and purposes of the invention, including those set forth above, have been met by providing a powder feeding system and method whereby the powder is entrained in a stream of gas, as air, which moves the powder from a source of supply through a flow path to the powder receiving zone of a tableting machine. Existing flow path systems create surging, compaction, bridging and, since they are not closed systems, they also create a dust problem, which means the operators most often need to use masks. The powder feeding system of this invention, being closed except for filtered outlets for excessive air, provides much improved powder flow, no bridging, no compaction and no dust. The system permits the direct compaction of powders which were previously granulated before tableting and increases substantially the output of the tableting machine while avoiding unacceptable variations in the table weight.

DETAILED DESCRIPTION

Figure 1:
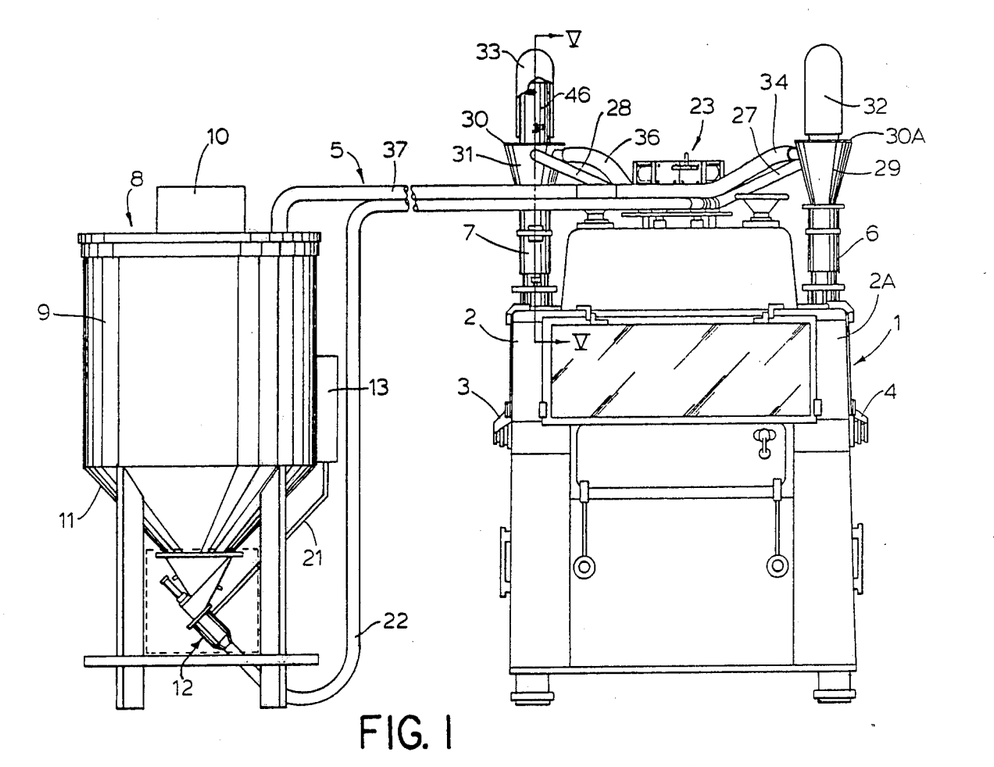
FIG. 1 is an elevational view of the tableting machine including powder feeding apparatus embodying the invention.
Figure 2:
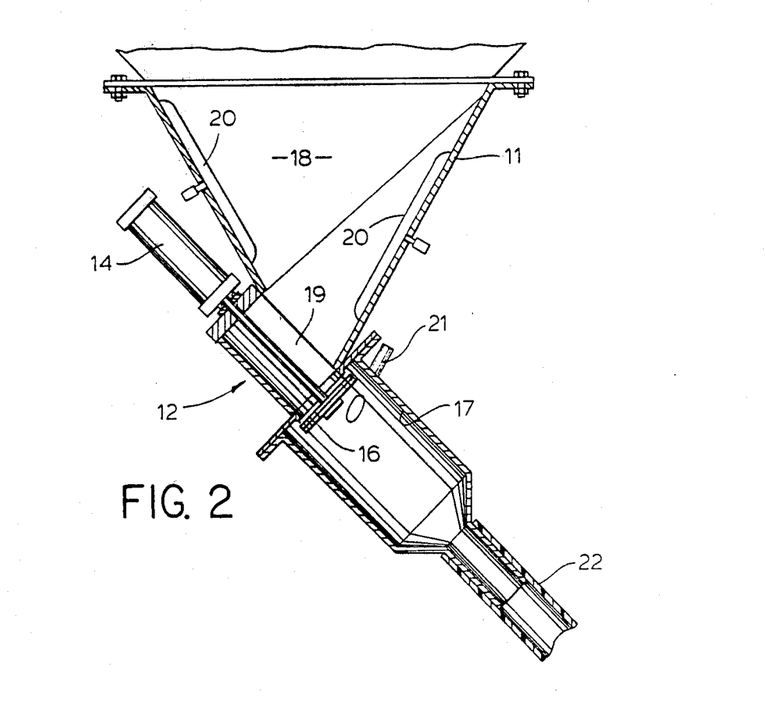
FIG. 2 is a central and vertical sectional view of that portion of FIG. 1 within the broken line rectangle and parallel with the plane of the drawing.
Figure 4:
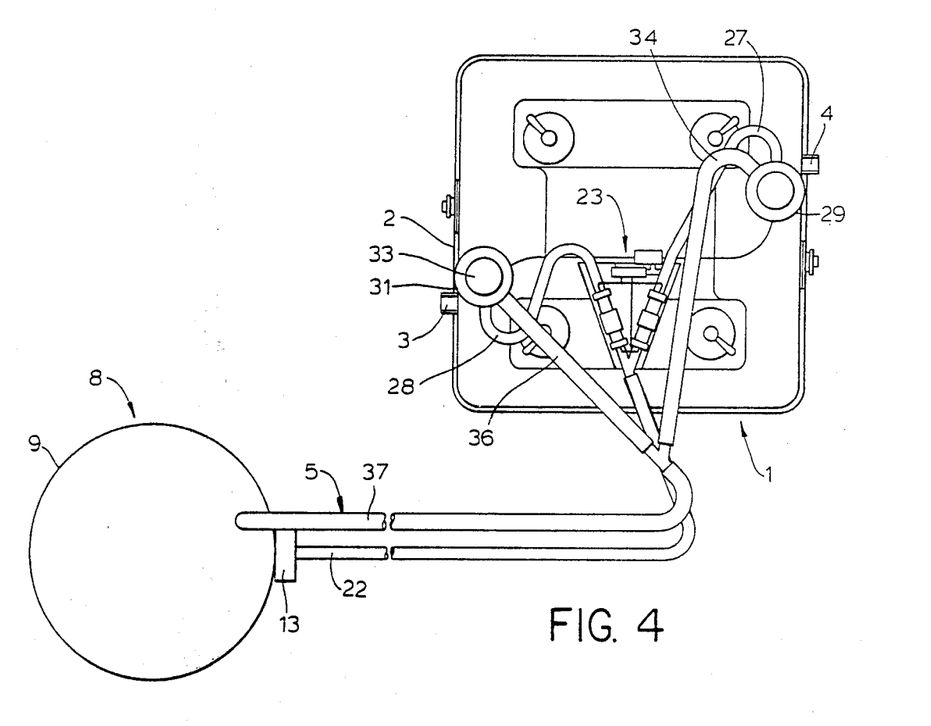
FIG. 4 is a top view of said tableting machine and feeding apparatus.

FIGS. 1 and 4 disclose an existing tableting machine with powder feeding apparatus which embodies the present invention. By way of example, said machine may be of the type identified as Rotopress Mark III and manufactured by Manesty Machines Ltd., Liverpool, England. Thus, while detailed description is believed unnecessary, the relevant parts will be mentioned briefly for the purpose of orientation and convenient reference.

The tableting machine 1 (FIGS. 1 and 4) has in the portions 2 and 2A thereof conventional means for receiving powder or granules, compressing same into tablets and discharging the tablets through the chutes 3 and 4, respectively. The small hoppers 6 and 7 comprise part of the powder feeding apparatus 5 of the invention, and they are located with respect to the tableting machine so as to discharge powder into the conventional tableting means of the tableting machine.

Figure 3:
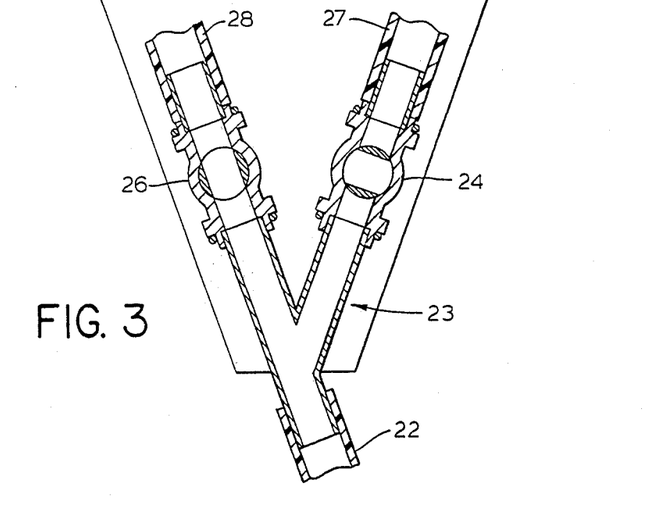
FIG. 3 is a central and sectional horizontal view of the diverter whereby the powder is directed into two conduits for the alternate feeding of both sides of a double-feed tableting machine.
Figure 3A:
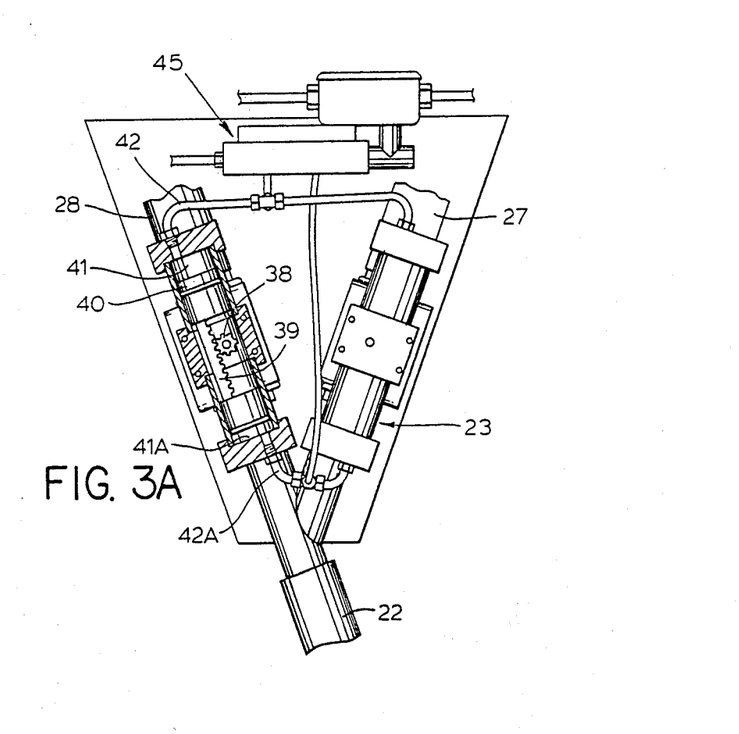
FIG. 3A is a partially sectioned, top view of the mechanism for operating the valves of the diverter shown in FIG. 3.

Associated with the tableting machine 1, as part of the feeding apparatus 5, is a powder supply mechanism 8 (FIGS. 1 and 4) comprising a relatively large and conventional supply hopper 9 having a downwardly converging lower end cone 11 discharging into the pump means 12 (FIG. 1). Said pump means 12 responds to control unit 13 for actuating the cylinder 14 to move the valve 16 downwardly into chamber 17. This permits powder (not shown) located within the compartment 18 defined by cone 11 to drop through the throat 19 into the chamber 17. The cylinder 14 then retracts the valve 16 to close the entrance into the chamber 17 and the control unit 13 supplies a burst (preferably for less than one second) of compressed air through the conduit 21 into said chamber 17. This air entrains the powder and conveys it through the conduit 22 to the diverter valve complex 23 (FIGS. 3 and 3A). There may be multiple conduits 21.

One or more perforate plates 20 (FIG. 2) may be mounted upon the cone 11 within the compartment 18 for discharging air under pressure as required to maintain the powder in said hopper 9 in a fluidized state.

The valves 24 and 26 (FIG. 3) of said diverter complex 23 are operated to direct the powder entrained air from the conduit 22 alternately to the conduits 27 and 28 and thence into the the upper conical portions 29 and 31, respectively, of the small hoppers 6 and 7 (FIG. 1). See also FIG. 5. The powder moves downwardly through means discussed further hereinafter within said small hoppers 6 and 7.

Figure 6:
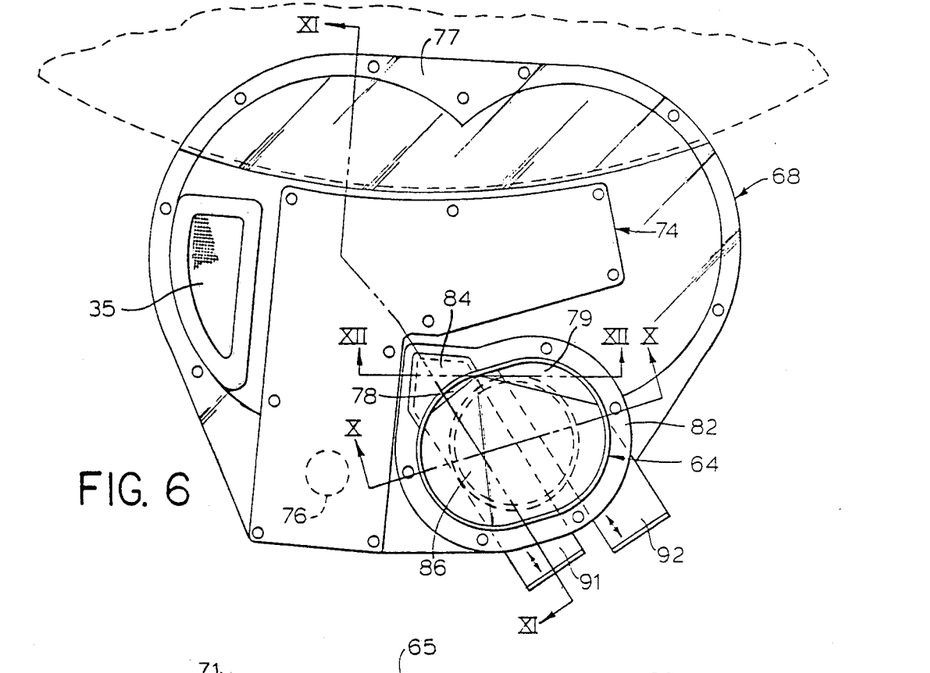
FIG. 6 is a section taken on the line VI—VI of FIG. 5.
Figure 7:
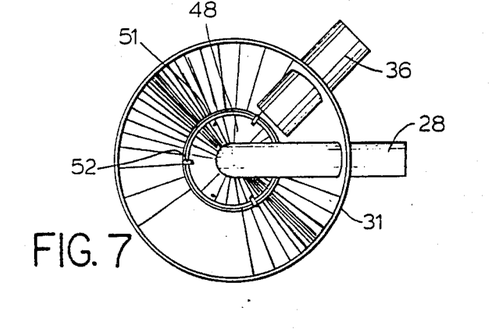
FIG. 7 is a sectional view taken along the line VII—VII of FIG. 5.
Figure 8:
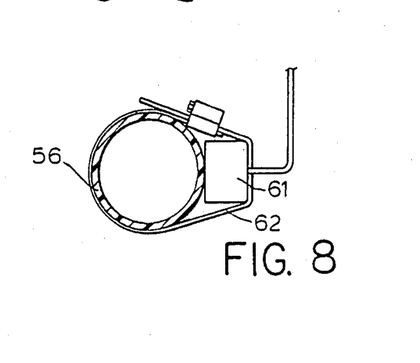
FIG. 8 is a sectional view taken along the line VIII—VIII of FIG. 5.

Most of the conveying air escapes through the discharge filters 32 and 33 mounted upon and communicating with the upper ends of the upper portions 29 and 31, respectively, of the hoppers 6 and 7. Almost all of the remaining excess air in the portions 29 and 31, with very little powder entrained therein, returns through the conduits 34 and 36 (FIG. 4) to the common return 37 which discharges said air into the hopper 9, which has a large filter 10. A small part of the air may escape through the filter screen 35 in the cover plate 77 (FIG. 6) of the paddle wheel or feed frame 68.

While the valves 24 and 26 (FIG. 3) may be operated by any conventional means, they are herein shown as driven by a pair of pinions, one of which is shown at 38, said pinions being operated respectively by a pair of racks, one of which appears at 39. The rack 39 is reciprocated by means of a double-acting piston 40 which responds to pressure fluid, usually air, introduced alternately into piston chambers 41 and 41A by conduits 42 and 42A (respectively) in response to conventional alternating control equipment 45. The rack associated with valve 24 is operated by identical means.

Said powder supply pump means 12 (FIG. 2) is in this instance manufactured and sold by Whitlock, Inc., of Farmington, Michigan, under the namde of "PowdrPump Conveyor", but it may be replaced by any other conventional means for delivering powder into an airstream, either intermittently or continuously, to the diverter 23 and thence to the small hoppers 6 and 7.

The small hoppers 6 and 7, which embody the present invention, are identical and hence it will be sufficient to describe in detail only one thereof, namely, the hopper 7. Said small hopper 7 (FIG. 5) comprises a conical upper portion 31 which converges downwardly. A cover 30 is fastened to the upper end of the cone or conical portion 31 by means of buckles 25. The cover 30 has a central opening 44 therein communicating with an upstanding collar 45 which in turn supports the open lower end of the cylindrical filter 33, which is closed at its upper end and preferably made of cloth. The upper portion 29 of the hopper 6 has a cover 30A which supports the filter 32 in a similar manner. If desired, a cylindrical filter screen 46 (FIG. 5) may be positioned within the filters 32 or 33 to provide additional support.

The inlet conduit 28 (FIG. 5) has a downwardly extending and downwardly diverging discharge portion 47 which is substantially coaxial with the cone 31. An upwardly converging conical baffle 49 is spaced inwardly from and supported by the discharge portion 47. A horizontal and circular baffle plate 51 is suspended and spaced downwardly from the bottom of the flared portion 47 by suitable hangers 52. The conical baffle 49 is positioned within the flared portion 47 as by a plurality of spacers 53 secured therebetween.

Figure 5:
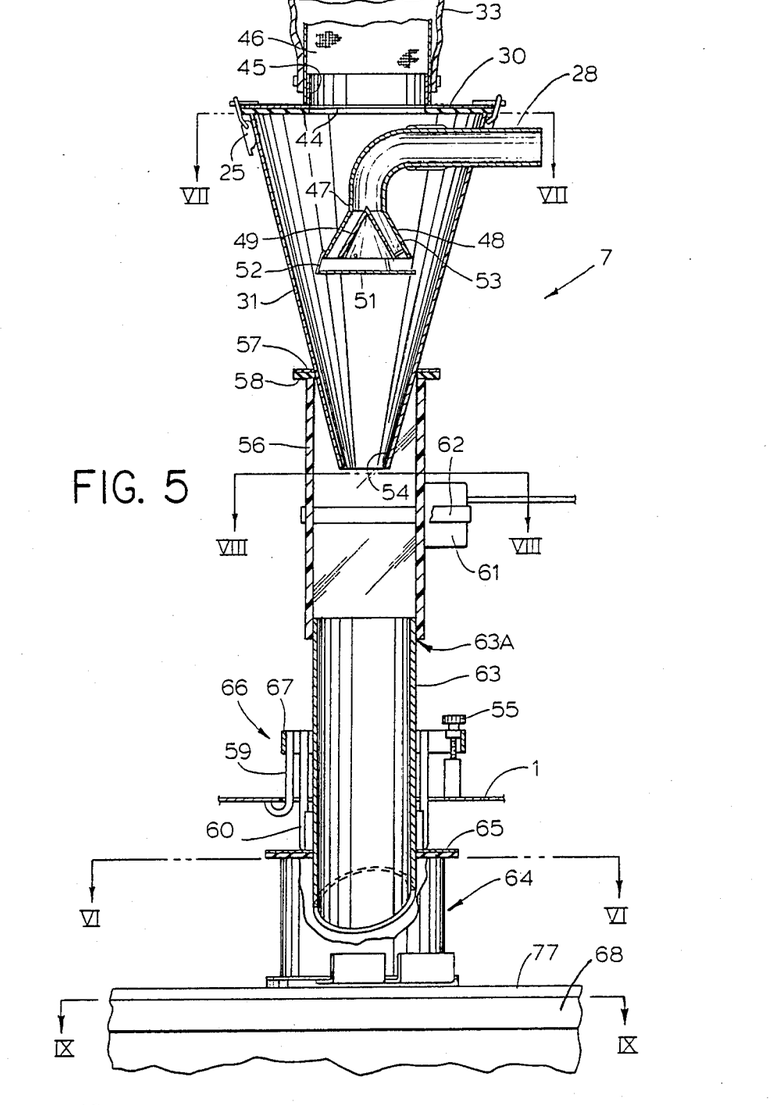
FIG. 5 is a central sectional view substantially as taken along the line V—V of FIG. 1.

The lower end of the cone 31 extends downwardly into and is sealingly engaged with the upper end of an upper sleeve 56. The attachment of the cone 31 to the sleeve 56 can be affected by a conventional flanged connection wherein a flange 57 secured to the cone 31 is bolted to a flange 58 on the upper end of the sleeve 56. The opening 54 at the lower end of the cone 31 should be sized to meet the demands of the tableting machine for powder.

Level or light sensing means of any conventional type, such as a photoelectric cell 61, may be attached to said sleeve 56 in any convenient manner, as by the bracket 62. In such case, the sleeve 56 is preferably transparent. Since the cell 61 can operate in response to normal room light, it will be activated when the powder level drops below the cell 61.

Said upper sleeve 56 is connected to a lower, preferably metal sleeve 63 which in turn is received into the upper open end of a modified feed bowl 64. The connections between the portion 31, the upper sleeve 56, the lower sleeve 63 and the feeder bowl are air-tight. Said bottom sleeve 63 is connected, as by welding, to the cover 65 of the feed bowl 64. The cover 65 is held tightly against the bowl 64 by the clamp structure 66 which has a ring 67 encircling the sleeve 63. A hook 59 on the ring 67 engages an upper part of the machine 1 and rods 60, also connected to the ring 67, engage the upper surface of the bowl cover 65. Screw means 55, when tightened, forces the rods 60 against the cover 65 whereby said cover 65 is forced against the bowl 64.

The small hopper 7, which comprises the upper cone 31 and the sleeves 56 and 63, is supported upon the machine 1 primarily by the clamp structure 66. However, the substantially rigid conduit 28 steadies the upper end of said hopper 7.

Figures 9, 10:
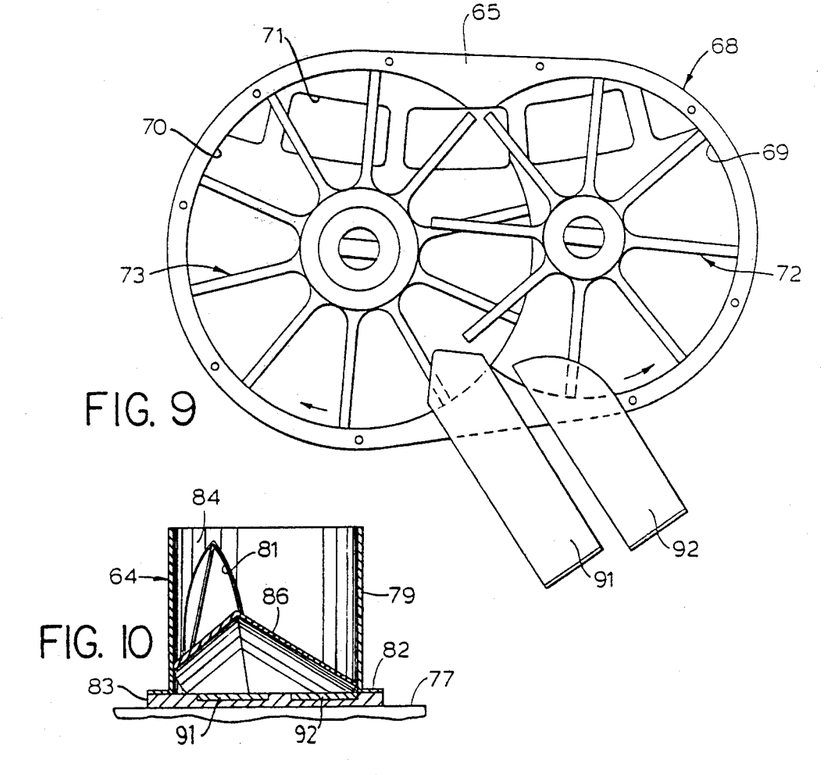
FIG. 9 is a sectional view taken along the line IX—IX of FIG. 5.
FIG. 10 is a sectional view taken along the line X—X of FIG. 6.
Figure 11:
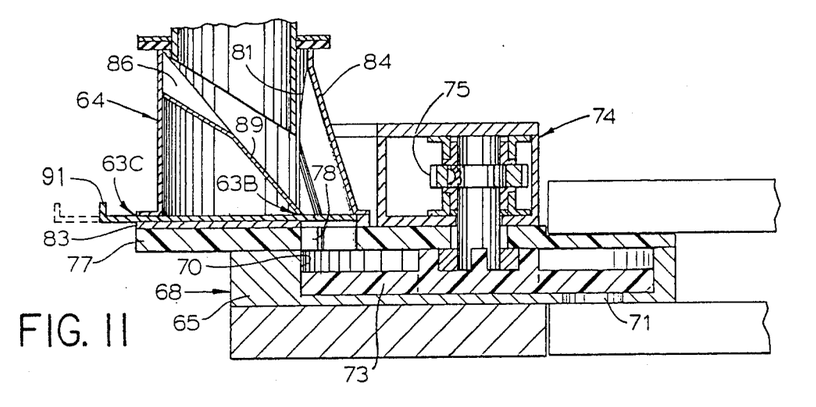
FIG. 11 is a sectional view taken along the line XI—XI of FIG. 6.

Modified feed bowl 64 (FIGS. 5, 10 and 11) comprises a feed frame 68 having a base 65 which is provided with a pair of intercommunicating, shallow recesses 69 and 70 (FIG. 9) through the bottom of which are provided a plurality of ports 71. A pair of cooperating, vertically offset and oppositely rotatable paddle wheels 72 and 73 are supported for rotation within the recesses 69 and 70, respectively. The wheels are driven by a gear train, one gear of which appears at 75 in FIG. 11, contained within the housing 74. Power is supplied to the gear train by means (not shown) including a drive shaft indicated at 76 in FIG. 6. Said shaft 76 extends downwardly through the feed frame 68 for rotation by a suitable power takeoff means within the tableting machine.

Figure 12:
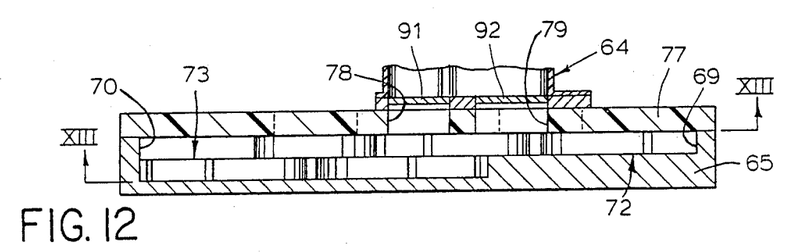
FIG. 12 is a sectional view taken along the line XII—XII in FIG. 6.

A plate 77 (FIGS. 6, 11 and 12) overlies the base 65 and closes same excepting for ports 78 and 79 therethrough. The feed bowl 64 is mounted on the plate 77, extends upwardly therefrom, is generally cylindrical and is provided with a downwardly diverging, elongated and lateral offset 81 in the side wall 84 thereof. A flange 82 (FIG. 10) is provided at the bottom of the feed bowl 64 for mounting same preferably through a gasket 83 onto the plate 77.

The offset 81 diverges downwardly relative to the wall 84 to provide a lean-to shape (FIG. 11) connecting the interior of the bowl 64 with the opening 78 whereby powdered material within said bowl will be conducted to and through the opening 78 into the recess 70 for movement by the star wheel 73 to and through the openings 71 into the die cavities of the tableting machine.

An upstanding, somewhat pyramidal deflector 86 (FIGS. 6, 10 and 11) is positioned in the lower part of the bowl 64 to guide the powder within said bowl into and through the ports 78 and 79. Two sides of said deflector 86 slope steeply to said ports 78 and 79 to expedite the flow of said powder from within the bowl to said ports.

Slides 91 and 92 (FIGS. 6 and 12) are slidably disposed within appropriate slots in said cover plate 77 adjacent the upper surface thereof for independent movement into and out of positions where they cover, at least partially, the ports 78 and 79. The slides 91 and 92 are arranged to control the sizes of the openings 78 and 79, respectively, from the feed bowl 64 to the recesses 70 and 69. Said slides are manually operable, but mechanical operation, including automatic control, is contemplated.

OPERATION

While the operation of the feeding apparatus of the invention has been indicated above, it will be reviewed briefly hereinafter.

The powder is delivered from hopper 9, as above described, by an airstream through the diverter valve complex 23 and into the conical member 31 via the conduit 28.

The flow of powder to the diverter 23 (FIG. 1) is effected by the pump 12 which is controlled by the control unit 13 so that the air is admitted to chamber 17 (FIG. 2) only when the valve 16 is closed. Also such air admission is limited to periodic bursts of less than one second duration. Thus, the powder travels through the conduit 22 in spaced batches.

The control unit 13 (FIG. 1) is activated on demand from the photoelectric cell 61, or its counterpart on the hopper 7. That is, when the powder level in sleeve 56 drops below the level of the cell 61, a signal is sent to control unit 13 to supply powder to hopper 7. At the same time, the piston 40 (FIG. 3A) is actuated to open valve 26 (FIG. 3), the actuation of piston 40 being initiated by control 45, also in response to a signal from the cell 61. The powder can now flow through diverter 23 and into the hopper 7. In one embodiment, the hopper 7 is refilled to its upper level with about four bursts from the pump 12. By filling the hopper 7 with intermittent batches, overloading of the cone 31, hence, compacting of the powder therein is avoided.

Due to the flared portion 47 of the conduit 28 and the conical baffle 49, which define an annular, diverging passageway, together with the baffle plate 51, the movement of the air entrained powder is in a generally horizontal and radial direction therefrom as it enters the cone portion 31 of hopper 7. The solid material (powdered or granular) then flows downwardly, partially by pressure and partially by gravity, through the lower end 54 of the cone 31 into the sleeve 56. Most of the gaseous carrier moves out of the cone 31, partly via the conduits 34 and 36 to return to the supply hopper 9 and partly to the atmosphere through the filter bag 33, thereby substantially reducing the total pressure within cone 31.

The opening in the lower end of cone 31 is selected to control the rate at which the material (such as powder) is permitted to enter the sleeve 56. As the powder emerges from the cone 31, it continues to fill the chamber within the sleeve 56 until the powder level is substantially, as two or three inches, above the photo cell 61. Under normal operating conditions, the lower sleeve 63 and bowl 64 will always be filled with powder. Thus, the differential in the level of powder in the sleeve, between high and low, will not be sufficient to adversely affect the density of all of the powder in the hopper 7 and therefore, will not affect the uniformity of the tablets being formed.

The relatively small opening in the lower end of cone 31 (FIG. 5), together with the powder immediately thereabove, tend to shield the interior of the sleeve 56 from the pressure of the air within the chamber of cone 31, and thereby cause said air to escape through the pipe 36 and the filter 33. Moreover, the powder flows into the sleeve 56 in a small stream rather than in one large mass. Thus the tendency for compacting of the powder within the sleeve 56 is avoided. At the same time there is sufficient agitation and turbulence within the cone 31, due to the radial movement of the powder as it leaves the baffle 51, that the powder will not compact or bridge within the cone 31, in spite of the small lower opening in said cone 31.

The powder deposited in said sleeve 56 (FIG. 5) subsequently moves downwardly through the lower sleeve 63 into the bowl 64. Thereafter, the powder passes through the ports 78 and 79, the slides 91 and 92 permitting, and into the recesses 69 and 70 where it is moved by the paddle wheels 72 and 73 through the openings 71 and into the die cavities of the tableting machine. The filter screen 35 (FIG. 6) provides for the final escape of any air under pressure, which may be trapped in the powder.

The solid material is caused to flow from conduit 22 to the hopper 6 via the diverter 23 in substantially the same manner as described above with respect to hopper 7. That is, in response to a signal from cell 61, the control 13 closes valve 26 and opens valve 24 so that air entrained powder can flow through valve 24 into hopper 6. Thereafter, the operation of hopper 6 wil be identical to the above-described operation of hopper 7.

The shape of the deflector 86 is such that it insures that powder deposited thereon will be quickly guided into the recesses 69 and 70, as required.

By appropriately controlling the size of the openings 78 and 79 through the cover plate 77 of the feed frame, as by means of slide gates 91 and 92, powder can be fed to the paddle wheels 72 and 73 at a rate such that said wheels can deliver said powder through the openings 71 without packing or other improper loading within the recesses 69 and 70.

Actual experimental work has been conducted with a feed system incorporating the invention and utilized with an existing tableting machine, such as the machine 1, and a powder source, as provided by the apparatus 8. The results have shown that feeding can be carried out effectively and efficiently by this system without packing, surging, bridging or other objectionable effects and at a much higher rate than previously achieved. In fact, the output of tablets from a standard machine has been tripled when equipped with the invention. Moreover, powders which have been especially difficult to feed to a direct compaction, tableting machine by existing equipment, can now be easily fed by the structure of the invention.

Figure 13:
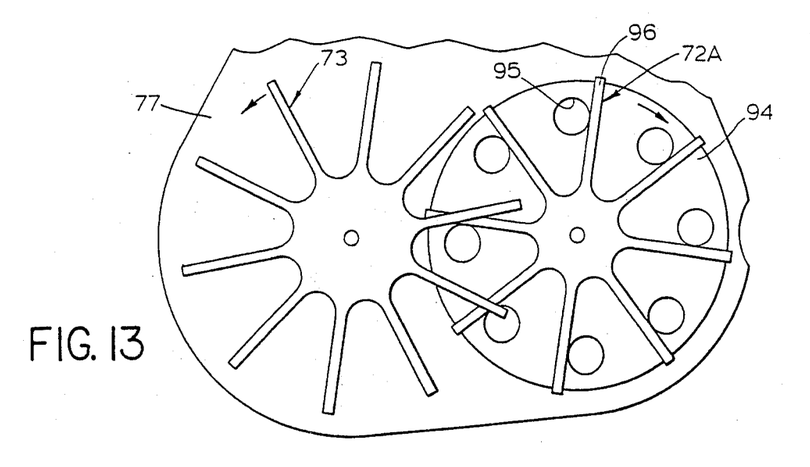
FIG. 13 is a sectional view taken along the line XIII—XIII in FIG. 12 and showing a modified feed wheel.

As shown in FIG. 13, one or both of the paddle wheels can be provided with a disk 94 having an opening 95 between adjacent blades of the paddle. This feature tends to provide better control over the delivery of some types of powders into the recesses 69 and 70.

The wheel 72A (FIG. 13) has a circular disk 94 attached to the upper surface thereof for rotation therewith. Said disk is slightly smaller in diameter than the wheel 72A and it has circular openings 95 therethrough in this embodiment. However, the sizes and shapes of said disk and openings may be modified to accommodate certain powders. One opening 95 is preferably located between each pair of arms 96 and adjacent to the leading arm of said pair in the direction of rotation. The disk tends to minimize the adverse effects of surges in the powder flow to the wheel 72A, and said disk might be attached to the lower surface of said wheel 72A in some instances.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method for feeding small solid particles to the intake of a tableting machine, the steps comprising:
   introducing said particles into a flow path;
   intermittently introducing into said flow path for a period of short duration a stream of gas under pressure to cause an intermittent flow of gas and particles along said path;
   discharging said stream into a first chamber against a deflector positioned therein for causing sideward deflection and diffusion of the stream;

then separating the particles and gas within said first chamber by permitting the particles to fall downwardly of said first chamber due to the urging of gravity while venting most of the gas from the upper portion of said first chamber so that the first chamber is only slightly pressurized;

causing said separated particles to be discharged from said first chamber through an opening adjacent the lower end thereof into a second chamber below said first chamber and to accumulate within said opening so as to momentarily isolate said particles in said second chamber from the pressure in said first chamber; and conducting said particles from said second chamber to the intake of said tableting machine.

2. The method of claim 1, including also the step of restricting the flow of said particles moving from said first chamber to said second chamber and maintaining said particles in a dispersed state in said second chamber;

and venting any remaining part of said carrying gas as said particles move from said second chamber into said tableting machine.

3. A method for feeding small solid particles of powder to the intake of a powder-using machine, such as a tableting machine, comprising the steps of:

introducing said particles into a flow path;

intermittently introducing into said flow path for a period of short duration a stream of gas under pressure to cause an intermittent flow of a gas-particle mixture along said path;

discharging the gas-particle stream vertically into the central region of a separating chamber to maintain said separating chamber at a slightly elevated pressure, and deflecting the discharged stream radially outwardly at a substantial angle relative to the vertical;

separating most of the gas from the particles within the separating chamber, and venting the separated gas outwardly from the upper portion of the separating chamber while permitting the particles to move downwardly into the lower portion of the separating chamber;

causing said particles to flow from the lower portion of said separating chamber through a small opening to effect the flow of a small stream of said particles into an accumulating chamber disposed below said separating chamber and to cause said particles to accumulate within said accumulating chamber while the particles within said separating chamber at least partially and momentarily isolate the accumulating chamber from the pressure within said separating chamber; and conducting said particles from said accumulating chamber to said intake.

4. A method according to claim 3, including the steps of sensing the level of particles accumulated within said accumulating chamber, and controlling the supply of particles to said separating chamber in response to the sensed level of particles within said accumulating chamber so that the quantity of accumulated particles within said accumulating chamber remains between predetermined upper and lower levels.

5. In a method for feeding small solid particles to the intake of a tableting machine, the steps comprising:

introducing said particles into a flow path;

intermittently introducing into said flow path for a period of short duration a stream of gas under pressure to cause an intermittent flow of gas and particles along said path;

providing a first chamber in a vertical orientation;

supplying the gas and particles stream into said first chamber for discharge of said stream into said first chamber in a substantially vertical direction;

separating most of said gas from the gas and particles stream in said first chamber by deflecting the discharged gas and particles stream radially outwardly at a substantial angle relative to the vertical direction and substantially uniformly around the line of discharge so that the gas can flow upwardly for separation from the particles which flow downwardly due to gravity;

venting said most of said gas from said first chamber adjacent the upper end thereof so that the pressure in said first chamber is only slightly elevated after said venting;

causing said separated particles within said first chamber to be discharged through an opening adjacent the lower end thereof into a second chamber disposed below said first chamber and to accumulate therein while at least partially and momentarily isolating said particles in said second chamber from the pressure in said first chamber; and conducting said particles from said second chamber to the intake of said tableting machine.

6. A method according to claim 5, wherein the gas and particle stream is vertically directed downwardly when discharged into said first chamber.

* * * * *